(12) United States Patent
Thornton et al.

(10) Patent No.: US 11,130,009 B2
(45) Date of Patent: Sep. 28, 2021

(54) ROTORCRAFT FALL RESTRAINT PROTECTION ATTACH POINTS AND MECHANISM SYSTEMS

(71) Applicant: Bell Helicopter Textron Inc., Fort Worth, TX (US)

(72) Inventors: Bob Thornton, Balch Springs, TX (US); Chyau Tzeng, Arlington, TX (US); Brian Mesing, Fort Worth, TX (US); Kevin Knott, Arlington, TX (US); Mark Wiinikka, Hurst, TX (US); Edith Richard, St-Jerome (CA); David Platz, North Richland Hills, TX (US); Joshua Edler, Colleyville, TX (US); Sarah Villanueva, Colleyville, TX (US); Thomas Mast, Carrollton, TX (US); Joseph Leachman, Keller, TX (US); Daniel John Burns, Fort Worth, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 338 days.

(21) Appl. No.: 15/343,678

(22) Filed: Nov. 4, 2016

(65) Prior Publication Data
US 2018/0126199 A1    May 10, 2018

(51) Int. Cl.
*A62B 35/00* (2006.01)
*B64C 27/32* (2006.01)
(Continued)

(52) U.S. Cl.
CPC ...... *A62B 35/0068* (2013.01); *A62B 35/0006* (2013.01); *A62B 35/0043* (2013.01);
(Continued)

(58) Field of Classification Search
CPC ............ A62B 35/0068; A62B 35/0006; A62B 35/0043; B64F 5/40; B64C 27/00; B64C 27/006; B64C 27/322
See application file for complete search history.

(56) References Cited

U.S. PATENT DOCUMENTS

| 2,719,593 | A | * | 10/1955 | Alex | ...................... B64C 27/322 416/140 |
| 2,738,939 | A | * | 3/1956 | Johnson | ................... B64D 1/22 244/137.2 |

(Continued)

FOREIGN PATENT DOCUMENTS

| CN | 109605301 A | * | 4/2019 |
| GB | 1235277 A |   | 6/1971 |

OTHER PUBLICATIONS

European Patent Office, European Search Report for EP Appl. No. 17165598.8 dated Oct. 17, 2017, 4 pp.
(Continued)

*Primary Examiner* — Colleen M Chavchavadze
*Assistant Examiner* — Candace L Bradford
(74) *Attorney, Agent, or Firm* — Edwin S. Flores; Daniel J. Chalker; Chalker Flores, LLP

(57) ABSTRACT

The present invention includes a safety apparatus and method for protecting users during maintenance operations for a rotorcraft comprising: at least one permanent, semi-permanent, or detachable safety bar, strap, fastener, hook, or loop that is attached or attachable to a rotorcraft, wherein the safety bar, strap, fastener, hook, or loop is positioned in an area or surface between a windshield of the rotorcraft and a tail boom of the rotorcraft and is connectable to a user safety device to provide fall protection from the area or surface.

12 Claims, 21 Drawing Sheets

(51) Int. Cl.
*B64C 27/00* (2006.01)
*B64F 5/40* (2017.01)

(52) U.S. Cl.
CPC .......... *B64C 27/00* (2013.01); *B64C 27/006* (2013.01); *B64C 27/322* (2013.01); *B64F 5/40* (2017.01)

(56) References Cited

U.S. PATENT DOCUMENTS

| | | | | | |
|---|---|---|---|---|---|
| 2,953,330 | A * | 9/1960 | Lysak | ...................... | B64D 1/22 244/118.1 |
| 3,036,315 | A * | 5/1962 | Karnow | .................... | B63C 9/26 441/83 |
| 3,081,121 | A * | 3/1963 | Campbell | ................ | B64D 1/22 294/82.3 |
| 3,158,357 | A * | 11/1964 | Campbell | ................ | B64D 1/22 258/1.2 |
| 3,348,791 | A * | 10/1967 | Mckinlay | ............... | B64D 39/00 244/2 |
| 3,563,497 | A * | 2/1971 | Holmes | .................. | B64C 27/02 244/12.3 |
| 3,912,200 | A * | 10/1975 | Foral | ..................... | B64C 27/006 244/17.11 |
| 4,379,534 | A * | 4/1983 | Miller | ..................... | B64D 1/22 102/354 |
| 4,478,312 | A * | 10/1984 | Kurtgis | .................... | H02G 1/02 182/142 |
| 4,609,165 | A * | 9/1986 | Logan | ................... | B64C 27/006 180/165 |
| 4,673,059 | A * | 6/1987 | Kurtgis | .................. | A62B 35/04 182/142 |
| 4,750,691 | A * | 6/1988 | Hollrock | ................ | B66C 23/18 212/299 |
| 4,858,855 | A * | 8/1989 | Dalbera | .................... | B64C 1/22 244/137.1 |
| 4,868,962 | A | 9/1989 | McArdle et al. | | |
| 5,020,742 | A * | 6/1991 | Haslim | .................... | B64D 1/22 244/137.2 |
| 5,417,304 | A * | 5/1995 | Kurtgis | .................... | B64D 1/18 182/150 |
| 5,593,113 | A * | 1/1997 | Cox | ........................ | B64D 1/08 177/245 |
| 5,687,812 | A * | 11/1997 | Gervais | ............. | A62B 35/0031 182/3 |
| 5,762,297 | A * | 6/1998 | Ascherin | .................. | B64D 1/22 244/137.1 |
| 7,216,740 | B2 * | 5/2007 | Dierkes | .................... | B64D 1/00 182/3 |
| 7,527,461 | B2 | 5/2009 | Ellis | | |
| 8,479,883 | B2 * | 7/2013 | Tkebuchava | ............ | B64D 1/22 182/129 |
| 8,905,354 | B2 * | 12/2014 | Griffiths | .................... | B64C 1/24 244/129.6 |
| 8,915,466 | B2 * | 12/2014 | Figoureux | ................ | B64D 1/22 244/17.11 |
| 9,103,628 | B1 * | 8/2015 | Moraites | .................. | G01S 3/784 |
| 9,452,910 | B2 * | 9/2016 | Huehn | ..................... | B66C 1/16 |
| 10,926,115 | B2 * | 2/2021 | Ettling | ..................... | B64F 5/40 |
| 2002/0175246 | A1 | 11/2002 | Kurtgis | | |
| 2004/0050343 | A1 | 3/2004 | Kurtgis | | |
| 2006/0032703 | A1 * | 2/2006 | Burdet | ............... | A62B 35/0068 182/3 |
| 2006/0273600 | A1 * | 12/2006 | Rohlf | .................. | A62B 35/0068 248/683 |
| 2010/0028151 | A1 * | 2/2010 | Loftus | .................... | B64C 27/008 416/144 |
| 2010/0065370 | A1 * | 3/2010 | Frauendorf | ............... | B64F 5/40 182/3 |
| 2013/0126269 | A1 | 5/2013 | Perner et al. | | |
| 2014/0239116 | A1 * | 8/2014 | Nicola | .................... | B64C 39/04 244/6 |
| 2015/0291288 | A1 * | 10/2015 | Bofill | ..................... | B64D 33/02 244/53 B |
| 2015/0360779 | A1 * | 12/2015 | Behrens | .................... | B64C 1/22 244/137.4 |
| 2017/0029133 | A1 * | 2/2017 | Lewis | .................... | B64D 39/06 |
| 2020/0002021 | A1 * | 1/2020 | Hara | ........................ | B64F 5/40 |

OTHER PUBLICATIONS

Canadian Intellectual Property Office, Examination Report for Canadian Appl. No. 2,963,402 dated Feb. 1, 2019, 4 pp.
Canadian Intellectual Property Office, Examination Report for Canadian Appl. No. 2,963,402 dated Apr. 22, 2020, 3 pp.
European Patent Office, Communication pursuant to Article 94(3) EPC for EP Appl. No. 17165598.8 dated Dec. 5, 2017, 7 pp.
Canadian Intellectual Property Office, Examination Report for Canadian Appl. No. 2,963,402 dated Nov. 9, 2020, 5 pp.

* cited by examiner

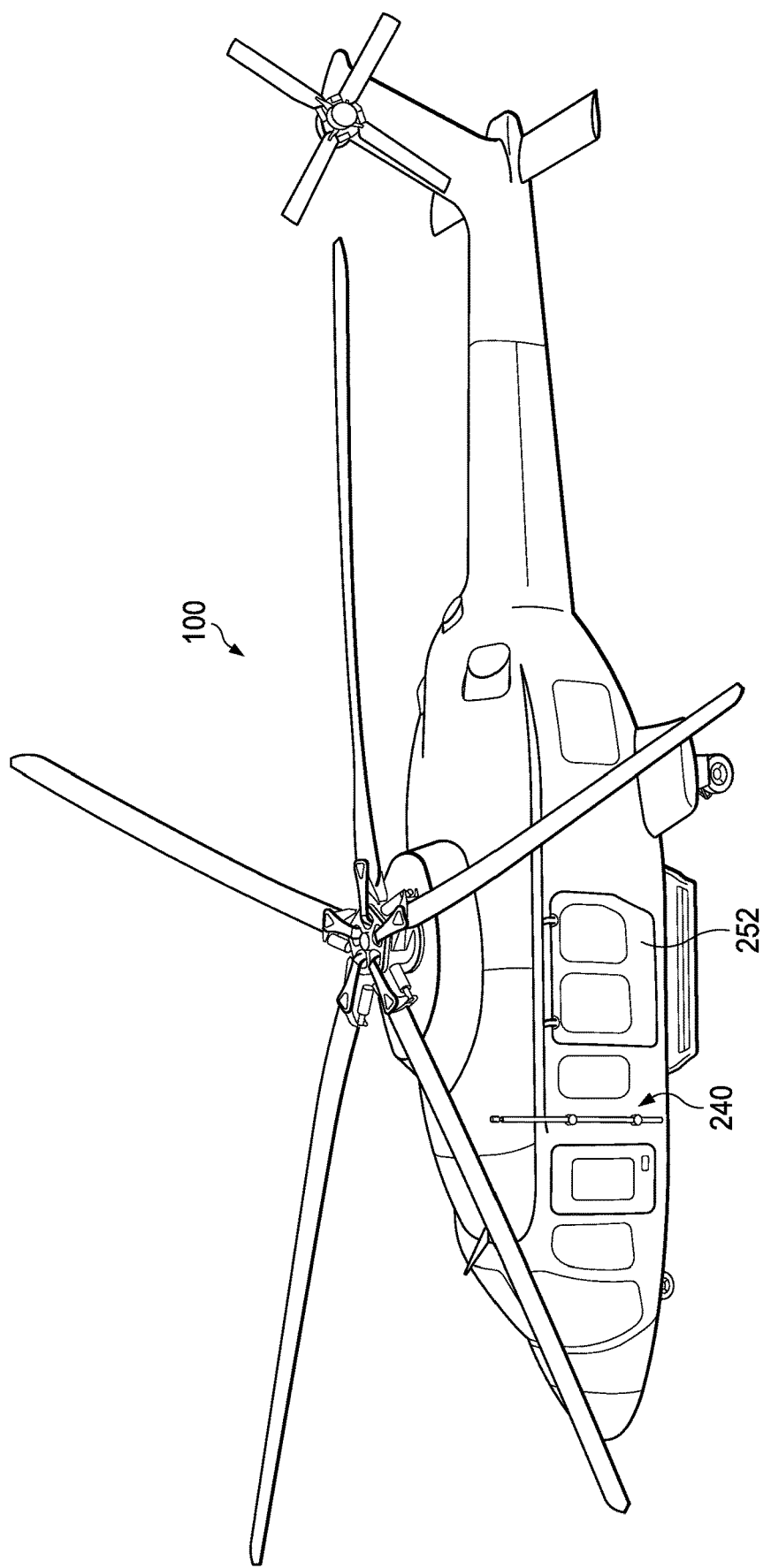

ROTORCRAFT FALL RESTRAINT PROTECTION ATTACH POINTS AND MECHANISM SYSTEMS

CROSS-REFERENCE TO RELATED APPLICATIONS

None.

STATEMENT OF FEDERALLY FUNDED RESEARCH

None.

TECHNICAL FIELD OF THE INVENTION

The present invention relates in general to the field of fall protection/restraint during maintenance operations, and more particularly, to fall protection/restraint for rotorcraft.

BACKGROUND OF THE INVENTION

Without limiting the scope of the invention, its background is described in connection with safety devices.

One such device is taught in U.S. Pat. No. 7,527,461, issued to Ellis, is entitled "Safety rail assembly". Briefly, this patent is said to teach a safety rail assembly for mounting on a deck of a transport carrier which transports and supports thereon at least one automobile having at least one of passenger and driver-side doors. The portable safety rail assembly includes a handrail extending horizontally relative to the upper surface of the deck and support posts for supporting the handrail, which support post may be removably mounted to the deck.

Another such device is taught in U.S. Patent Publication No. 2006/0032703, filed by Burdet is entitled "Fall restraint device." Briefly, this patent application is said to teach an anchor assembly for preventing a user from falling from an object, comprising: a strap; a mechanism for retaining the strap on the object; and at least one anchor point on the strap to which the user can secure. Further, a fall restraint device for preventing a user from falling from an object, comprising: an anchor assembly for tightening around the object and for keeping the strap tight around the object; a safety harness for securing to a user; and a lanyard securable to the anchor assembly and to the safety harness for preventing the user from falling from the object is also said to be taught.

SUMMARY OF THE INVENTION

In one embodiment, the present invention includes a safety apparatus for a rotorcraft comprising: at least one permanent, semi-permanent, or detachable safety bar, strap, fastener, hook, or loop that is attached or attachable to a rotorcraft, wherein the safety bar, strap, fastener, hook, or loop is positioned in an area or surface between a windshield of the rotorcraft and a tail boom of the rotorcraft and is connectable to a user safety device to provide fall protection from the area or surface. In one aspect, the strap is semi-permanent or detachable and is positioned about the body of the rotorcraft comprising the hook, loop, ring, D-ring, lanyard, tie off, carabiner, positioned on the side or top of the rotorcraft that provide an anchor point for a user safety device. In another aspect, the one or more safety bars are connected to one or more sides of the rotorcraft at hard points that are within or outside a body of the rotorcraft, wherein the safety bar is at least one of vertical, horizontal, or diagonal orientation to the ground and provides an anchor point for a user safety device. In another aspect, the safety bar, hook, or loop is positioned on a yoke, grip, flapping stop or other structural component of the rotor of the rotorcraft. In another aspect, the safety bar, hook, or loop is positioned in, on, within, or about a firewall between an engine and the rotorcraft. In another aspect, the safety bar, strap, fastener, hook, or loop is adapted to be supported by a rotor. In another aspect, the safety bar, strap, fastener, hook, or loop is attached to one or more hard points on an engine. In another aspect, the safety bar, strap, fastener, hook, or loop is attached to a yoke of the rotorcraft. In another aspect, the user safety device is a line, belt, harness, fall limiter, sling seat, bosun chair, chest harness, fall prevention device, fall prevention system, fall restraint device, personal fall arrest system, or other fall prevention device.

Another embodiment of the present invention includes a method of providing fall protection for a rotorcraft comprising: providing at least one permanent, semi-permanent, or detachable safety bar, strap, fastener, hook, or loop that is attached or attachable to a rotorcraft, wherein the safety bar, strap, fastener, hook, or loop is positioned in an area or surface between a windshield of the rotorcraft and a tail boom of the rotorcraft; and connecting a user safety device to the at least permanent, semi-permanent, or detachable safety bar, strap, fastener, hook, or loop that is attached to the rotorcraft. In one aspect, the method further comprises positioning the strap on the side or top of the rotorcraft to provide an anchor point for a user safety device. In one aspect, the method further comprises connecting one or more safety bars to one or more sides of the rotorcraft at hard points that are within or outside a body of the rotorcraft, wherein the safety bar is at least one of vertical, horizontal, or diagonal orientation to the ground and provides an anchor point for a user safety device. In one aspect, the method further comprises positioning the safety bar, hook, or loop on a spar of a yoke of the rotorcraft. In one aspect, the method further comprises positioning the safety bar, hook, or loop in, on, within, or about a firewall between an engine and the rotorcraft. In one aspect, the method further comprises supporting the safety bar, strap, fastener, hook, or loop from a rotor. In one aspect, the method further comprises attaching the safety bar, strap, fastener, hook, or loop to one or more hard points on an engine. In one aspect, the method further comprises attaching the safety bar, strap, fastener, hook, or loop is attached to a yoke of the rotorcraft. In another aspect, the user safety device is a line, belt, harness, fall limiter, sling seat, bosun chair, chest harness, fall prevention device, fall prevention system, fall restraint device, personal fall arrest system, or other fall prevention device. In one aspect, the method further comprises attaching the permanent, semi-permanent, or detachable safety bar, strap, fastener, hook, or loop that is attached or attachable to a rotorcraft to a user via a safety device under austere environmental conditions. In another aspect, the permanent, semi-permanent, or detachable safety bar, strap, fastener, hook, or loop that is attached or attachable to a rotorcraft provide fall restraint with a fixed lanyard via a harness attached to a fixed point on the rotorcraft.

BRIEF DESCRIPTION OF THE DRAWINGS

For a more complete understanding of the features and advantages of the present invention, reference is now made to the detailed description of the invention along with the accompanying figures and in which:

FIG. 12C shows an isometric view of a rotorcraft showing one position for the attachment of the fall protection/restraint attachment shaft that is removable.

DETAILED DESCRIPTION OF THE INVENTION

Figure 1:
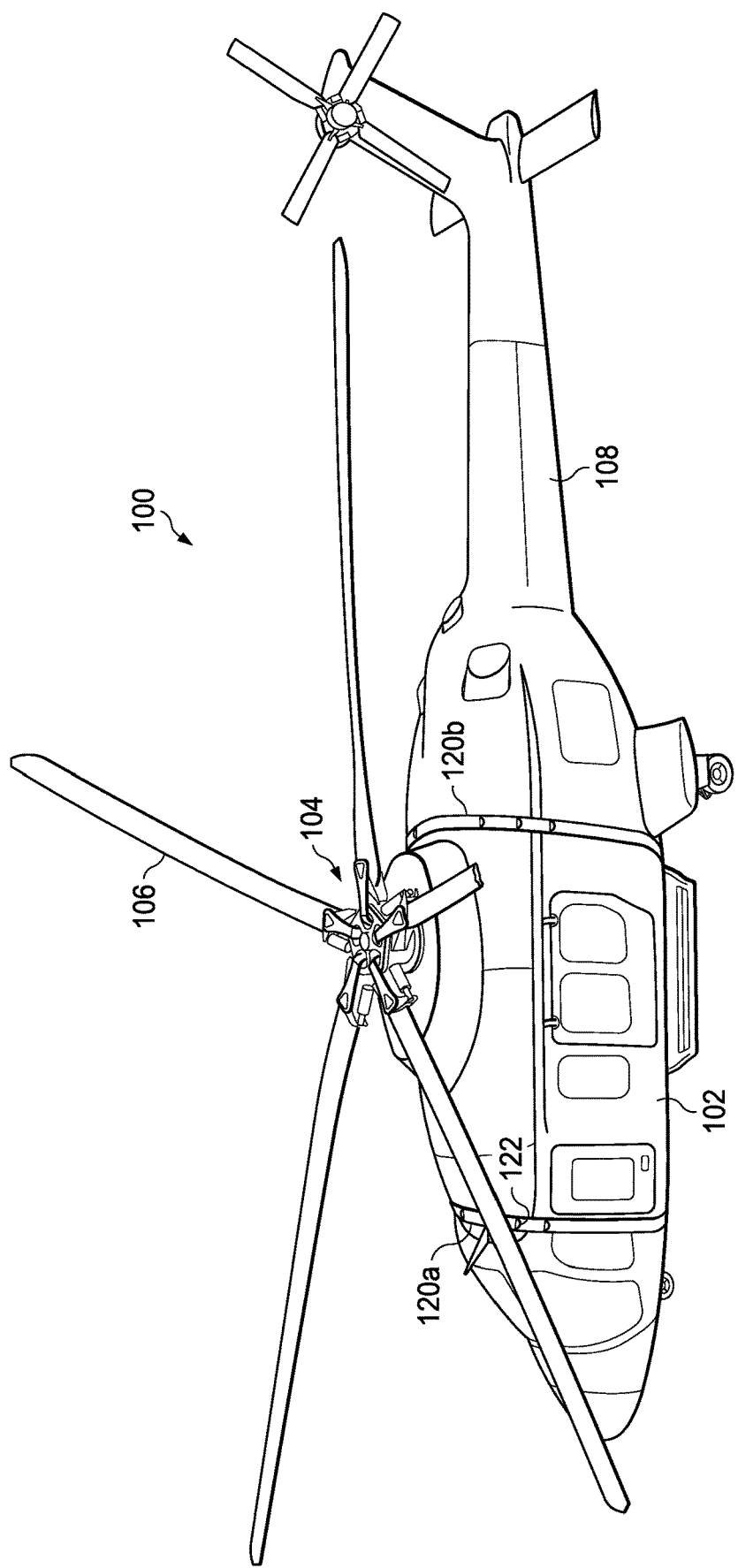
FIG. 1 depicts a rotorcraft in accordance with a preferred embodiment of the present application.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

There are no known rotorcraft qualified with fall protection/restraint system applications as of today. There are related systems close to this invention, but they differ from this invention primarily on deployment applications. Existing systems are external and portable fall protection systems to rotorcrafts. This invention is integral to the rotorcraft such that it can be used away from home base in austere environments (oil rig landing pad, improvised landing zone, etcetera).

This invention is intended to provide fall restraint protection for personnel working or performing maintenance on an aircraft's roof deck or an aircraft's structural components of over four feet high in relation to ground as described by OSHA under the general industry regulations/requirements. This fall restraint is to be achieved by prescribing the use of a fixed lanyard "dog leash", currently from 3.5 to 4.0 feet long and attaching a person via a harness D-Ring to a fixed point on the aircraft. The present invention provides the breakdown of each zone and its corresponding proposed solution to fall protection.

Thus, this invention relates to fall protection/restraint on rotorcraft where maintainers or flight crew may perform their respective activities above four feet off the ground. The fall protection/restraint systems of the present invention can be used in conjunction with existing personal equipment. For example, commonly used fall restraint garments, vests, can be attached to one end of a fixed length lanyard via a combiner to a qualified attach point on the rotorcraft and the other end of the lanyard to a person's D-ring harness to provide fall restraint.

The fall restraint systems of the present invention are the first of their kind to be provided and fitted into rotorcraft for operators to use without the need of special ground support equipment. The unique use of existing structure and systems are used without penalizing the overall weight of the aircraft or adding significant risk of damage to the aircraft. Although the risk of injury or damage to the aircraft is not completely removed, it is mitigated to reduce the loss of lives and reduce the areas of material damage to the aircraft.

FIG. 1 depicts a rotorcraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with rotor system 104 for creating flight, which also includes a tail boom 108. The system of the present invention can be used in conjunction with the rotorcraft 100. Although shown associated with a helicopter, it will be appreciated that the system of the present application could also be utilized with different types of rotary aircraft and vehicles. FIG. 1 shows straps 120a and 120b positioned on the fuselage 102. The straps 120a and 120b are depicted surrounding the fuselage 102, however, it is also possible that the straps 120a and 120b are attached to fixed points along the fuselage 102. Attachment points 122, in this example shown as D-rings, can be positioned along the straps 120a and 120b such that a user can attach to the attachment points 122 while working on the rotorcraft 100 and provide fall protection when working on the rotorcraft 100 in circumstances where gantries and other fixed or movable supports are not available, e.g., away from a repair facility such as austere environments: oil rig landing pad, improvised landing zone, et cetera.

Figure 2:
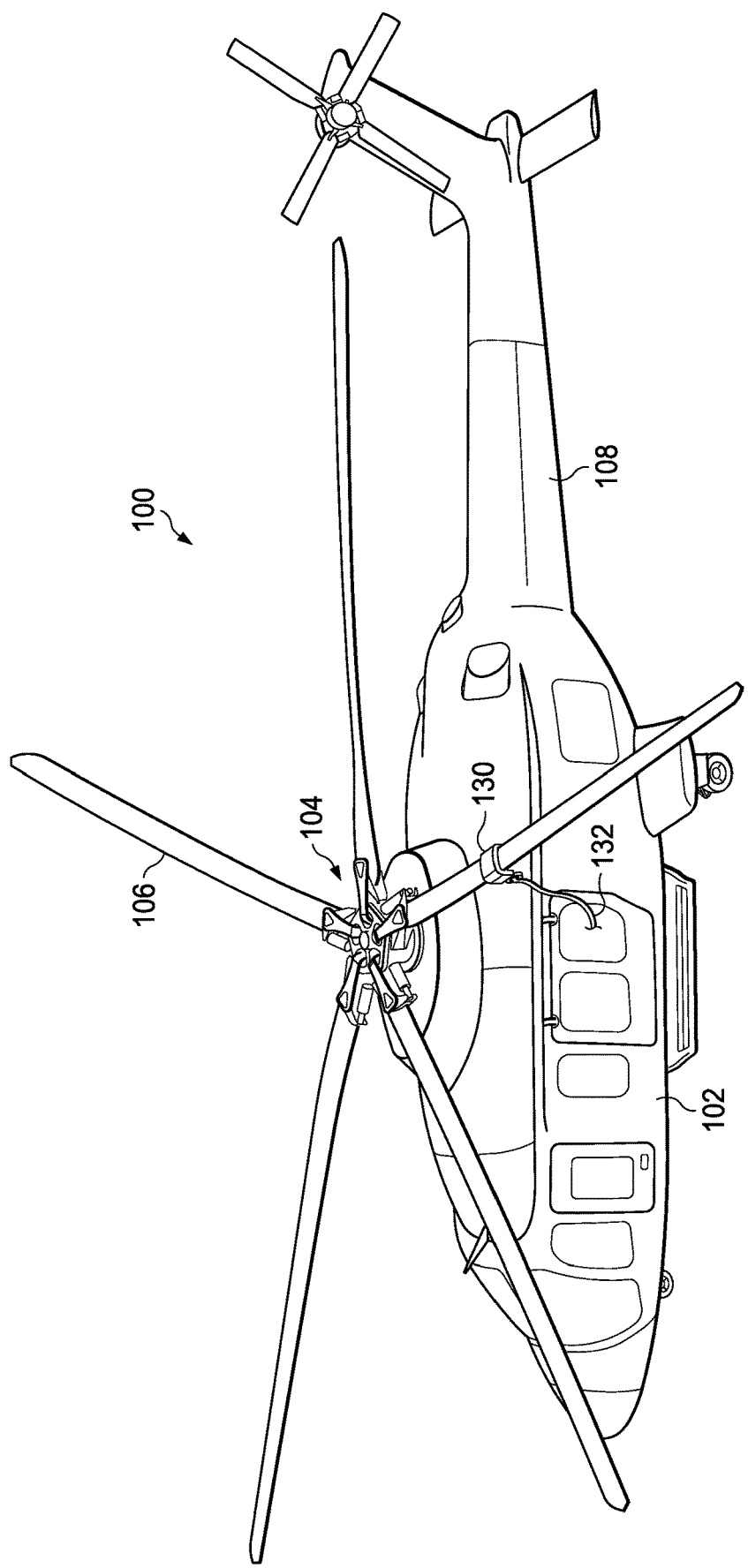
FIG. 2 shows a fall protection/restraint device of the present invention.

FIG. 2 shows another fall protection/restraint device of the present invention. The fall protection/restraint hook 130 is depicted with a strap 132 is attached to one of the rotor blades 106 of the rotorcraft 100. The fall protection/restraint hook 130 will generally be of a material that is compatible with the rotor blades 106, such that the rotor blades 106 are protected from any damage during use of the fall protection/restraint hook 130. For example, the fall protection/restraint hook 130 could have cushioning between the fall protection/restraint hook 130 and the rotor blades 106, which cushioning would limit or eliminate any possible damage to the rotor blades 106 during operation. The strap 132 can hang directly down, or be provided with a mechanism or device that allows attachment to, e.g., the straps 120 depicted in FIG. 1, or the hard attachments points that will be discussed in each of the following figures. Those additional attachments points may be permanent or temporary. The user would attach a line to the fall protection/restraint hook 130 to provide fall protection to the user when working at or around the fuselage of the rotorcraft 100, whether close or away from the fuselage 102.

Figure 3:
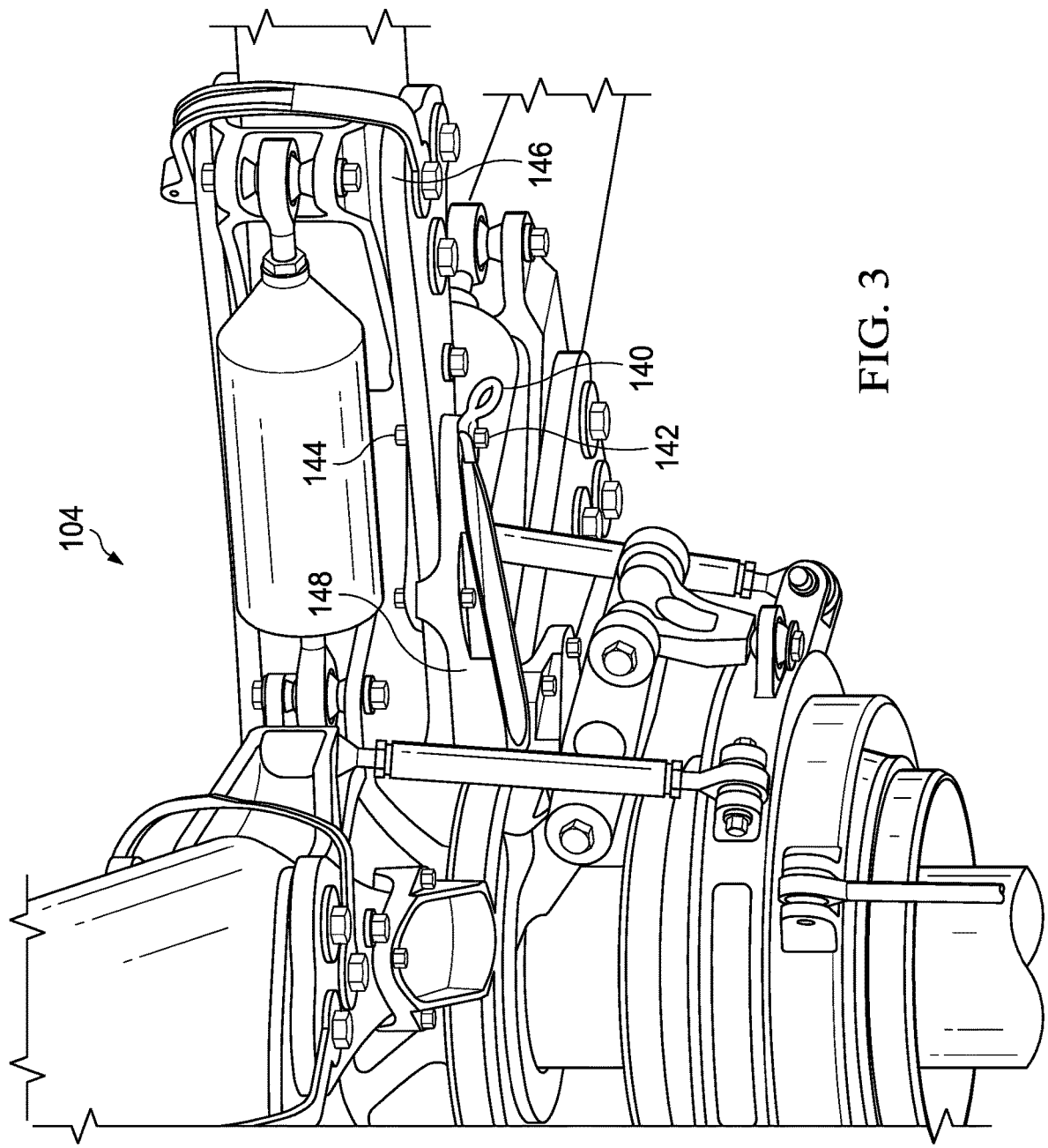
FIG. 3 is an isometric close-up view of a fall protection/restraint device around the rotor system.

FIG. 3 is an isometric close-up view of a rotor system 104, which shows a fall protection/restraint loop 140, which is affixed via a bolt 142 and nut 144 to the grip 146 and flapping stop 148. The fall protection/restraint loop 140 is depicted as having an angle between 0 and 90 degrees and can be permanently attached to the grip 146 and flapping stop 148 and provide support within an existing rotor system 104. The user would attach a line to the fall protection/restraint loop 140 during operation and it would provide fall protection to the user when working at or around the main rotor.

Figure 4A:
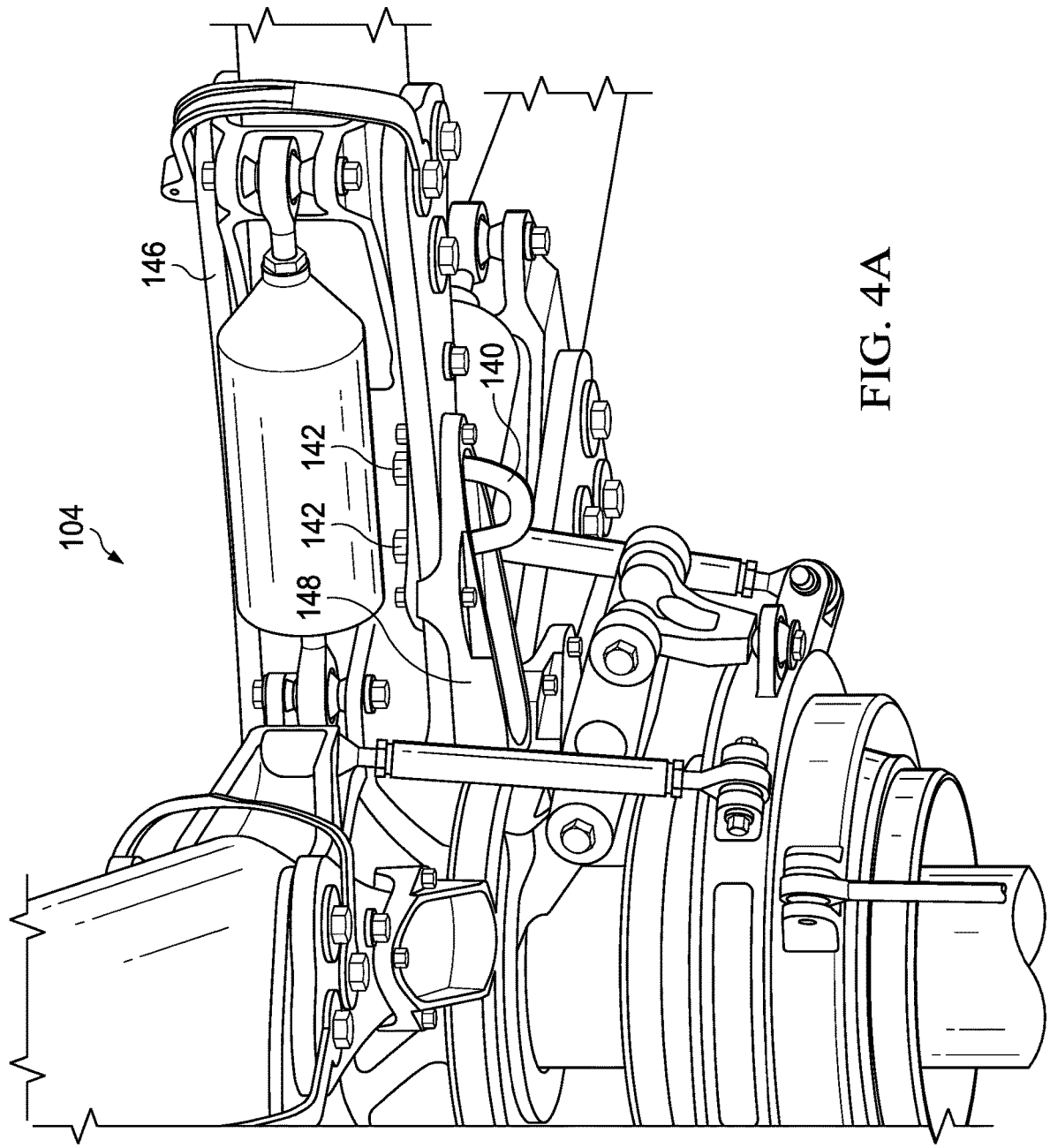
FIGS. 4A to 4C shows fall protection/restraint loops attached to, or integral, with the flapping stop.
Figure 4B:
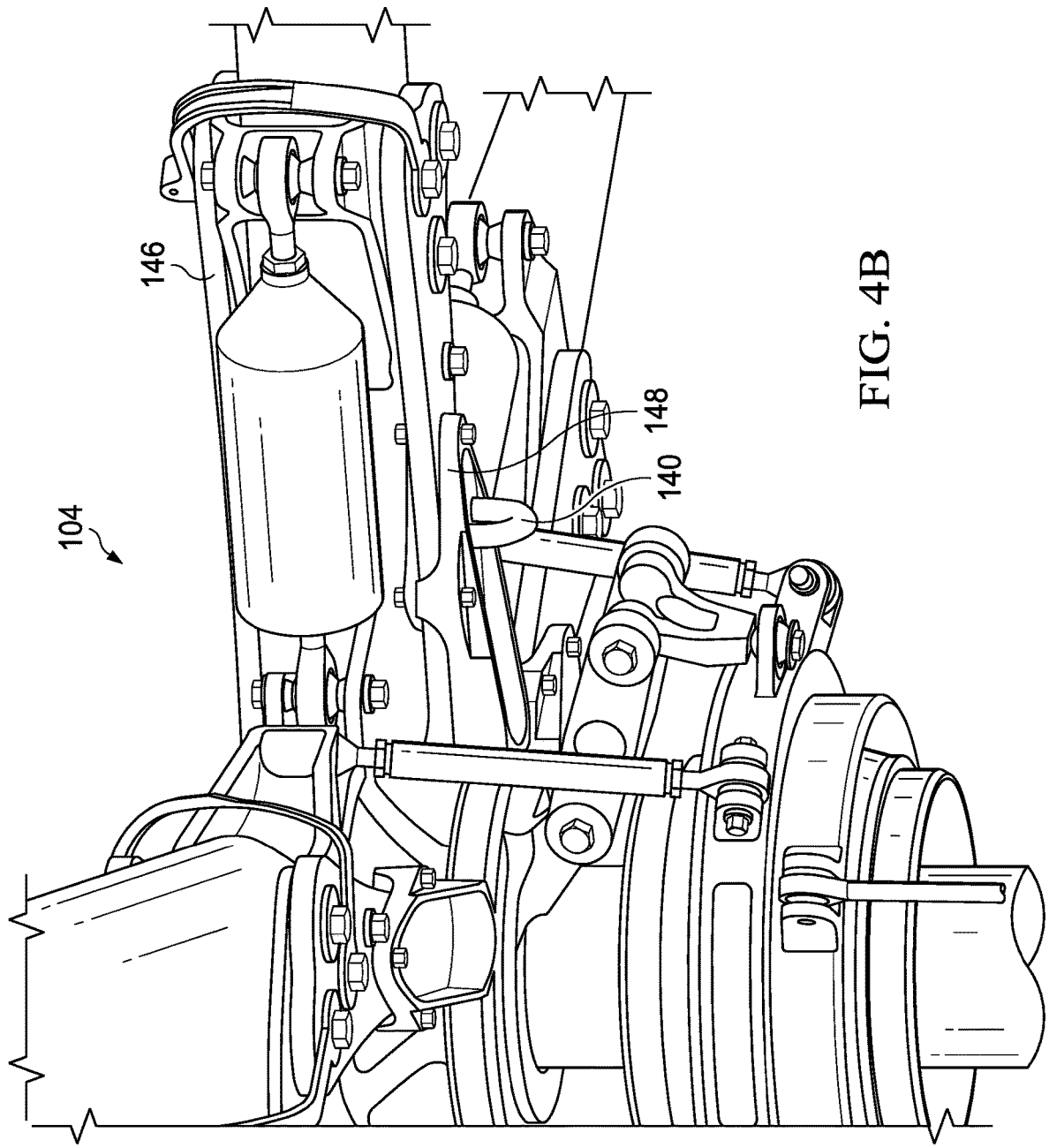
Figure 4C:
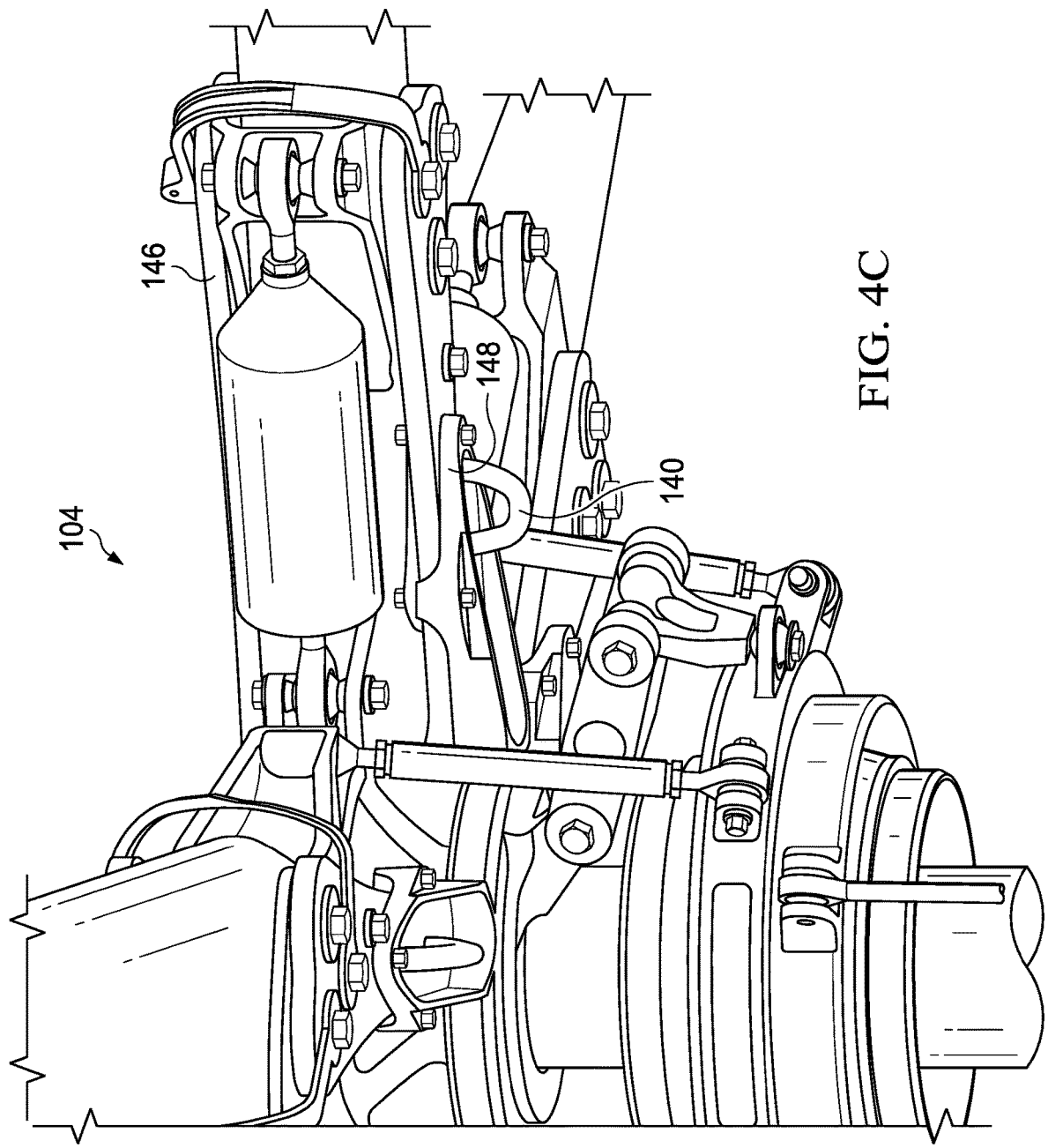

FIGS. 4A to 4C show various different versions of the fall protection/restraint loop 140 in connection with the grip 146 and flapping stop 148, which are variants from those shown in FIG. 3. In FIG. 4A the fall protection/restraint loop 140 is bolted via bolts 142 to the flapping stop 148 and grip 146. In FIG. 4B, the fall protection/restraint loop 140 is integral with the flapping stop 148, but is perpendicular to the span-wise direction of the rotor hub. In FIG. 4C, the fall protection/restraint loop 140 is also integral or welded to and within an indentation in the flap stop 148 of the grip 146.

Figure 5:
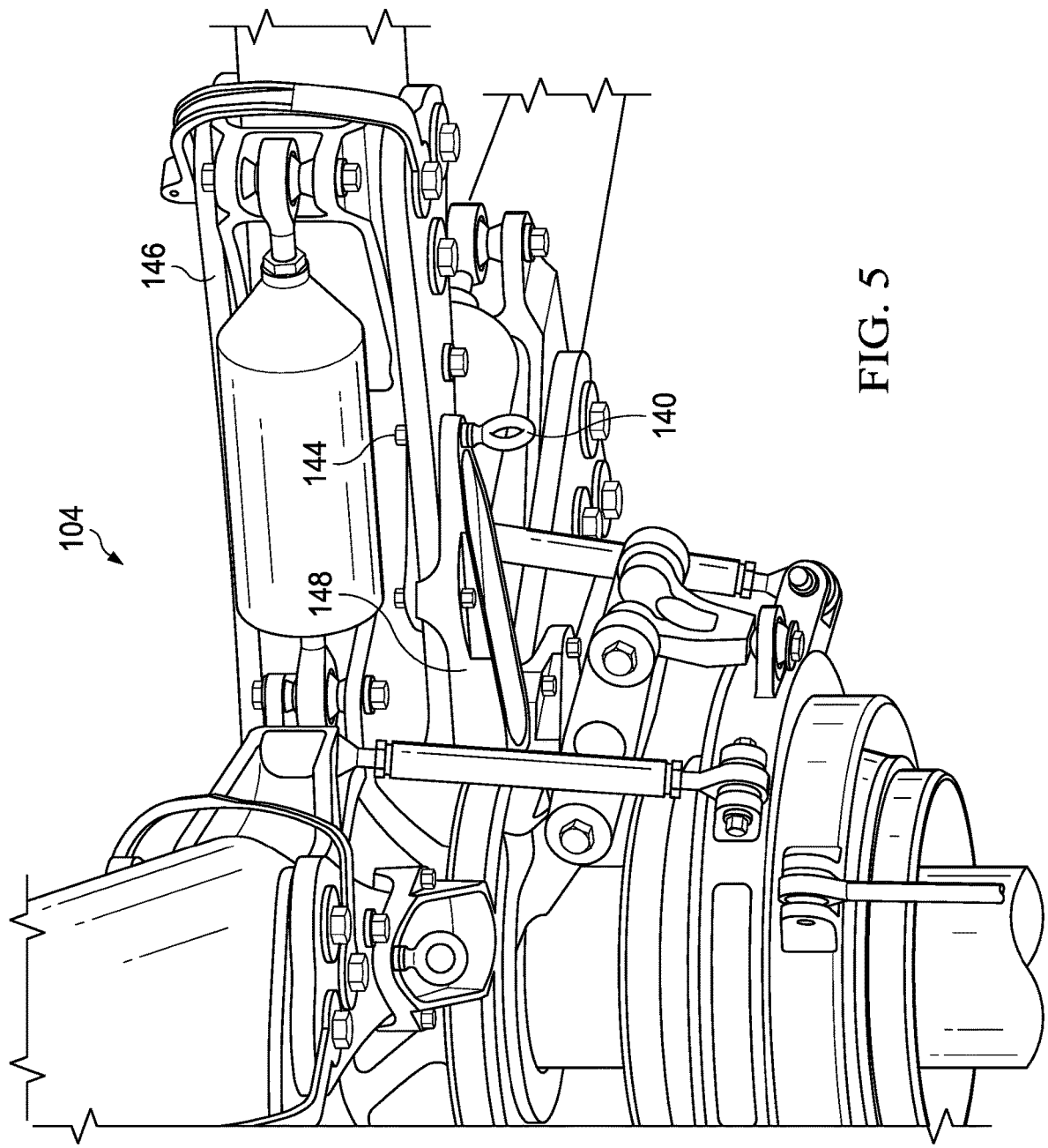
FIG. 5 shows a fall protection/restraint loop attached to the grip and flapping stop.

FIG. 5 shows the fall protection/restraint loop 140 that is attached to the flap stop 148 and grip 146, in this case shown as an eyelet that is attached via a nut 144.

Figure 6:
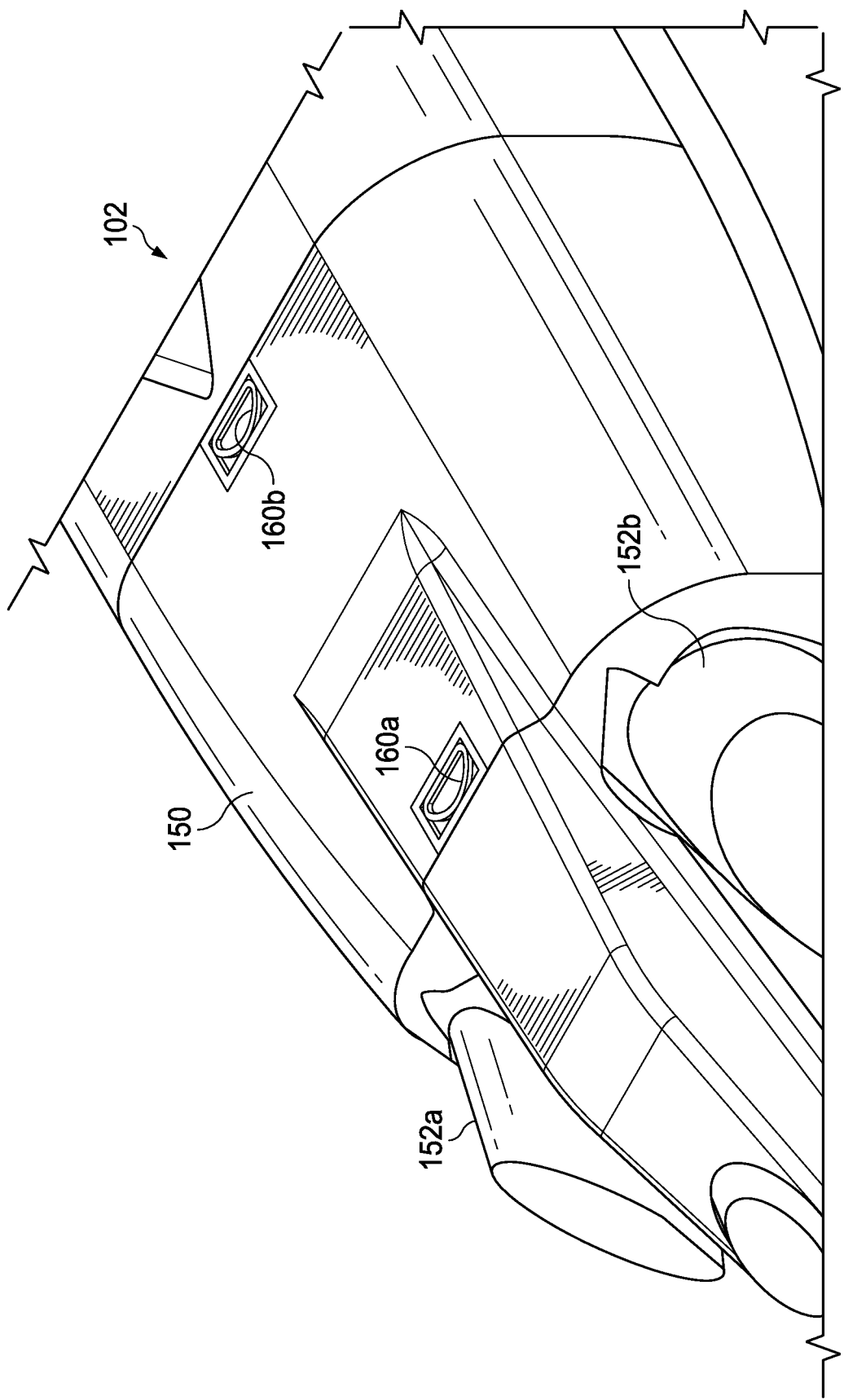
FIG. 6 shows the top of a cowling of the fuselage above the engines.

Moving aft from the rotor assembly, FIG. 6 shows the cowling 150 top of the fuselage above the engines 152a and 152b, which is shown with a rotorcraft having two engines, but would be equally applicable for single or multi-engine rotorcraft. In this embodiment, the fall protection/restraint loops or handles 160a and 160b are depicted. These the fall protection/restraint loops or handles 160a and 160b will not open the cowling 150, but rather provide fall protection/restrain aft of the rotor assembly but before the tail boom.

Figure 7A:
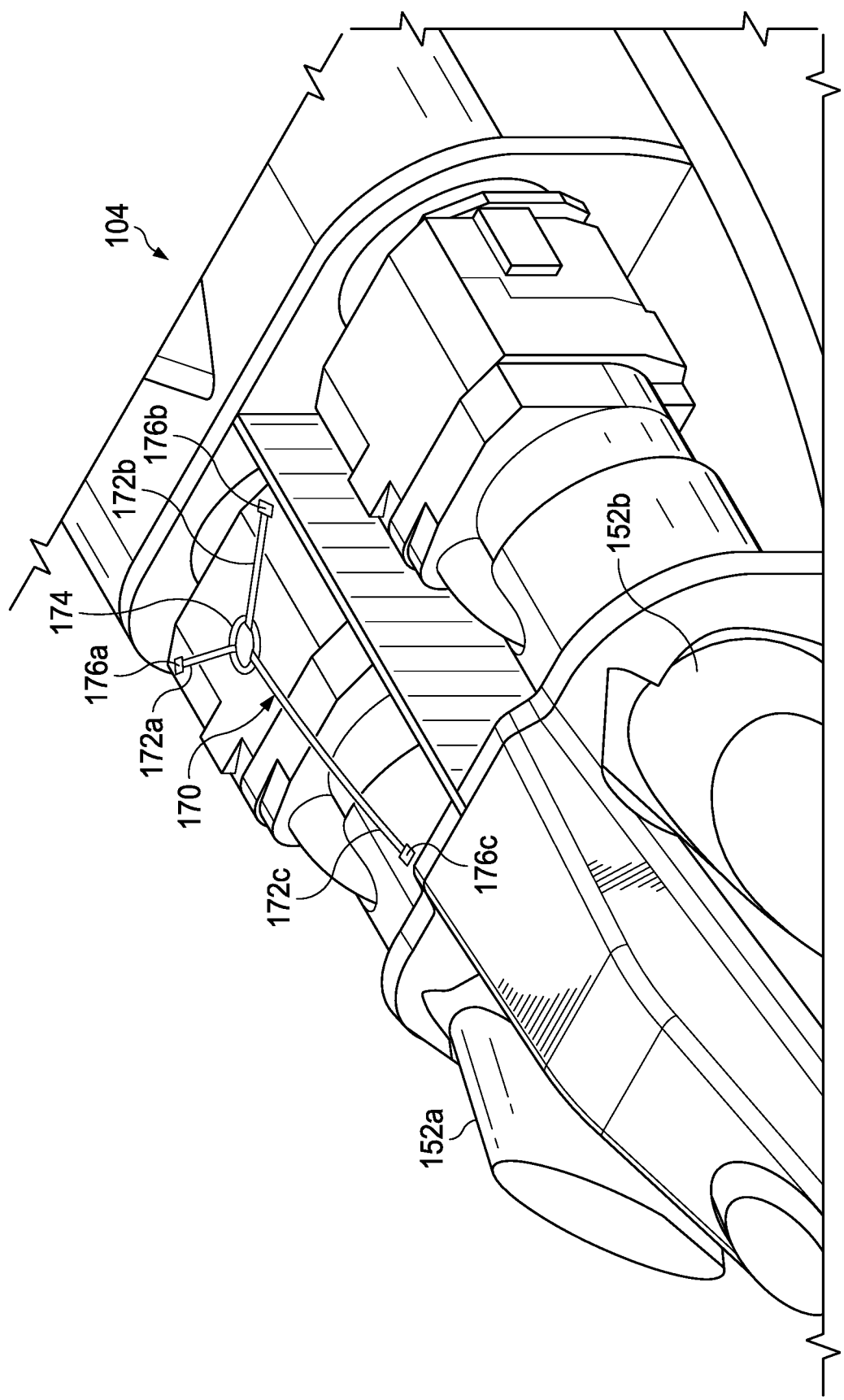
FIGS. 7A and 7B show a fall protection/restraint mechanism that includes straps attached to hard points of an engine.

FIG. 7A shows yet another embodiment of a fall protection/restraint mechanism 170 that includes straps 172a-c, in this version shown with a ring 174 (which is not required but provides additional options). The straps 172a-c, are attached to existing hard-points 176a-c, respectively, and that can be existing hard attachment points for, e.g., removing the engine 152a from the rotorcraft. This fall protection/restraint mechanism 170 provides fall protection/restraint once the cowling shown in FIG. 6 has been removed.

Figure 7B:
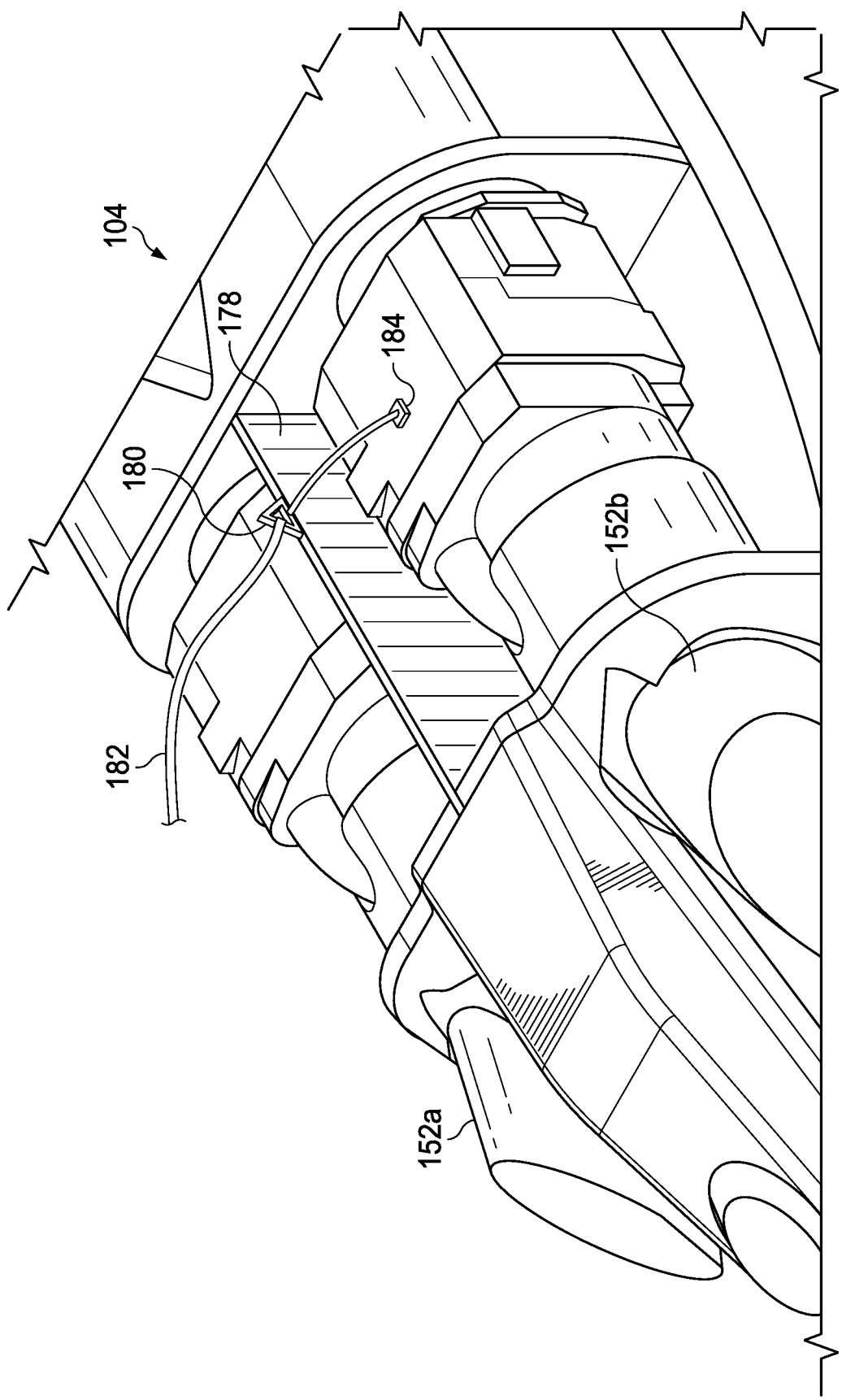

FIG. 7B shows yet another embodiment of a fall protection/restraint mechanism 180 (which can be temporary or permanent), shown in this embodiment on firewall 178, which serves as one point of attachment for a strap 182, with a second point of attachment at a hard point 184 on the engine 152b or engine 152a.

Figure 8:
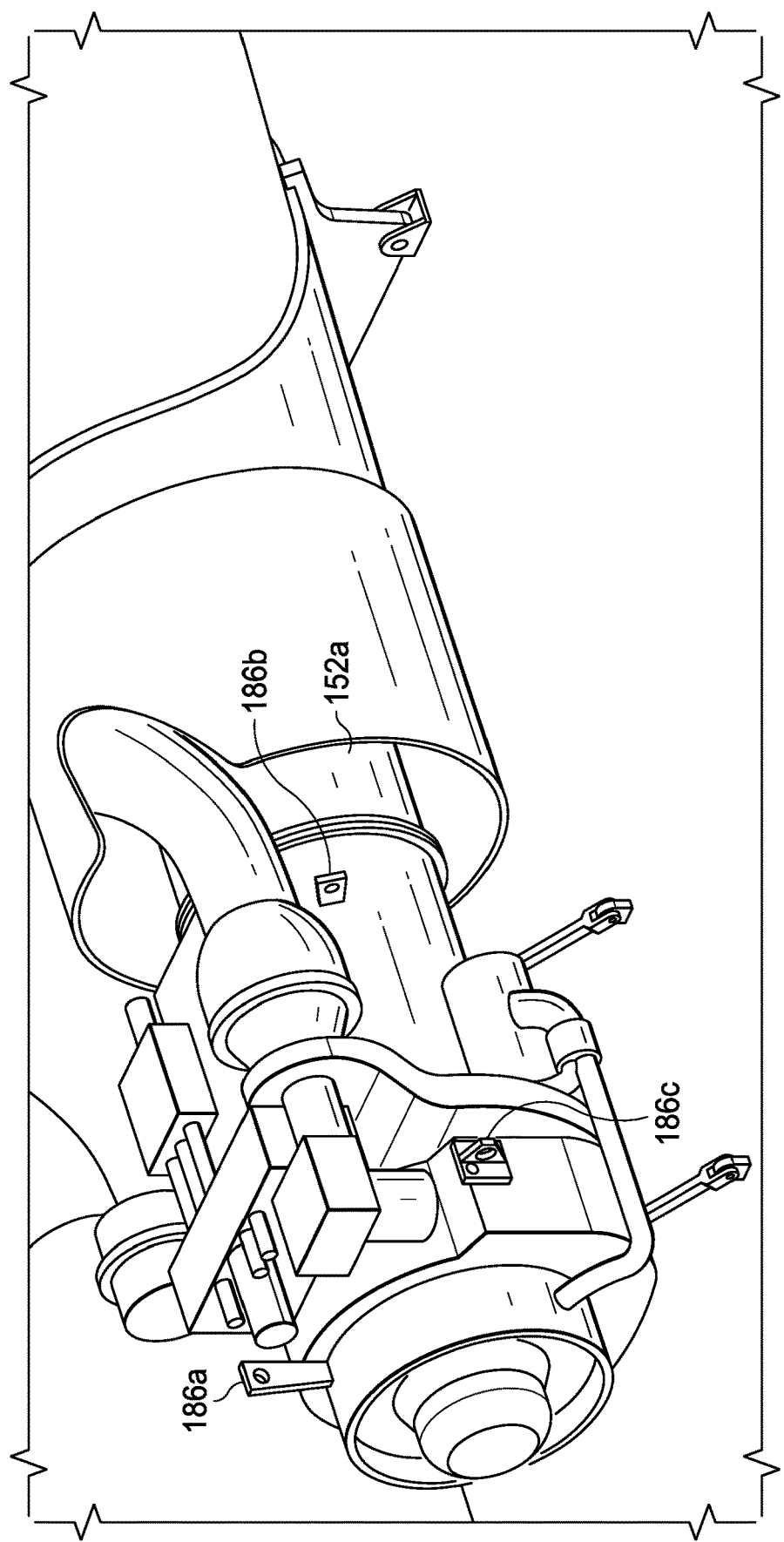
FIG. 8 shows another view of the hard-points (which can be permanent or temporary), at different positions of the engine.

FIG. 8 shows another view of the hard-points 186a, 186b, and 186c (which can be permanent or temporary), which can be positioned on the engine 152a, such that these hard-points provide a place to attach a harness of straps that provide fall protection/restraint during maintenance operations on or about the engine 152a or engine 152b (not depicted in this figure, but the hard points would be equally applied to it as well).

Figure 9A:
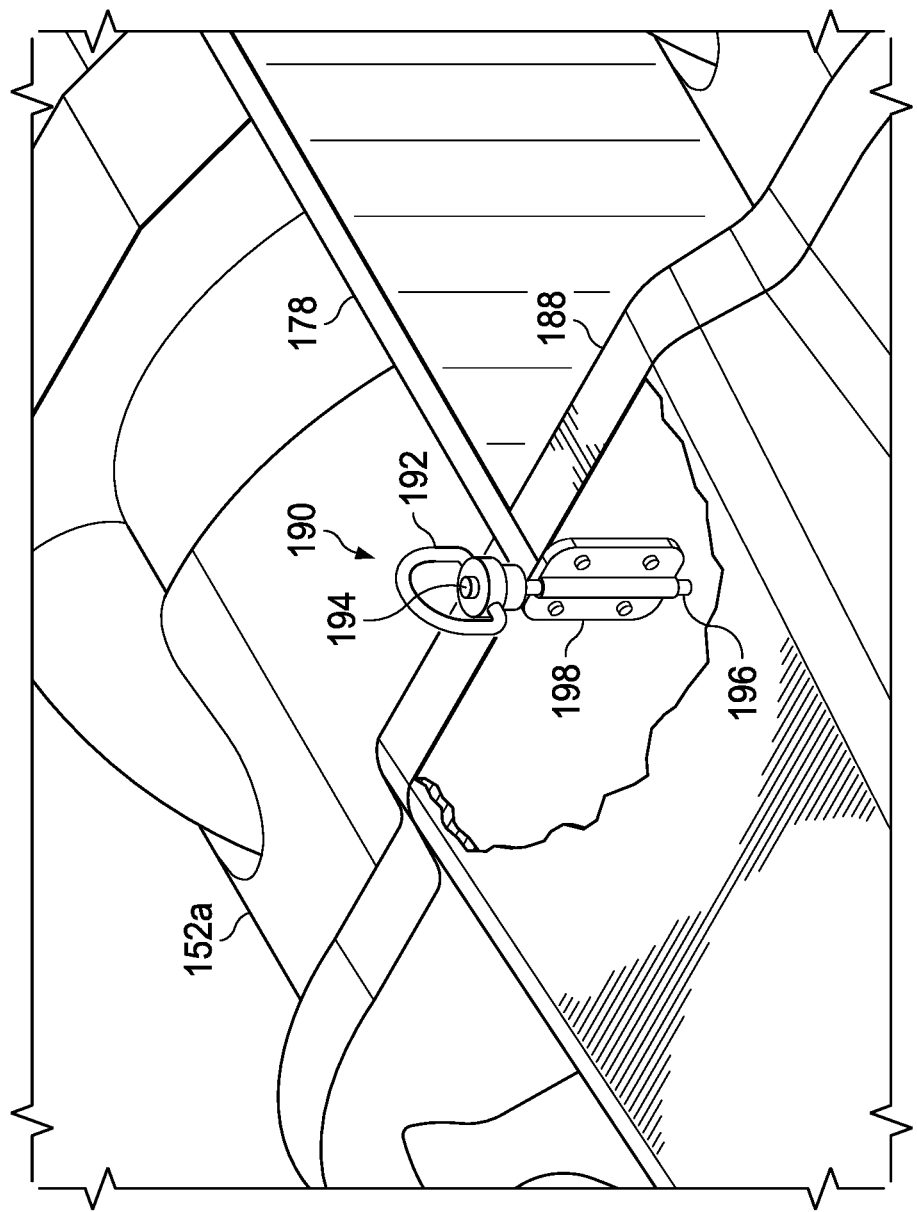
FIGS. 9A and 9B show yet another embodiment of a fall protection/restraint mechanism, which is shown positioned at the intersection of firewalls between and behind the engines.

FIG. 9A shows yet another embodiment of a fall protection/restraint mechanism 190, which is shown positioned at the intersection of firewall 178 and firewall 188, which is the rear firewall shown in relation with engine 152a. The fall protection/restraint mechanism 190 depicted includes a ring 192, which includes a release button 194, which helps release the shaft 196 from the attachment plaque 198, which is depicted as being permanently attached to the firewall 188 via bolts or rivets.

Figure 9B:
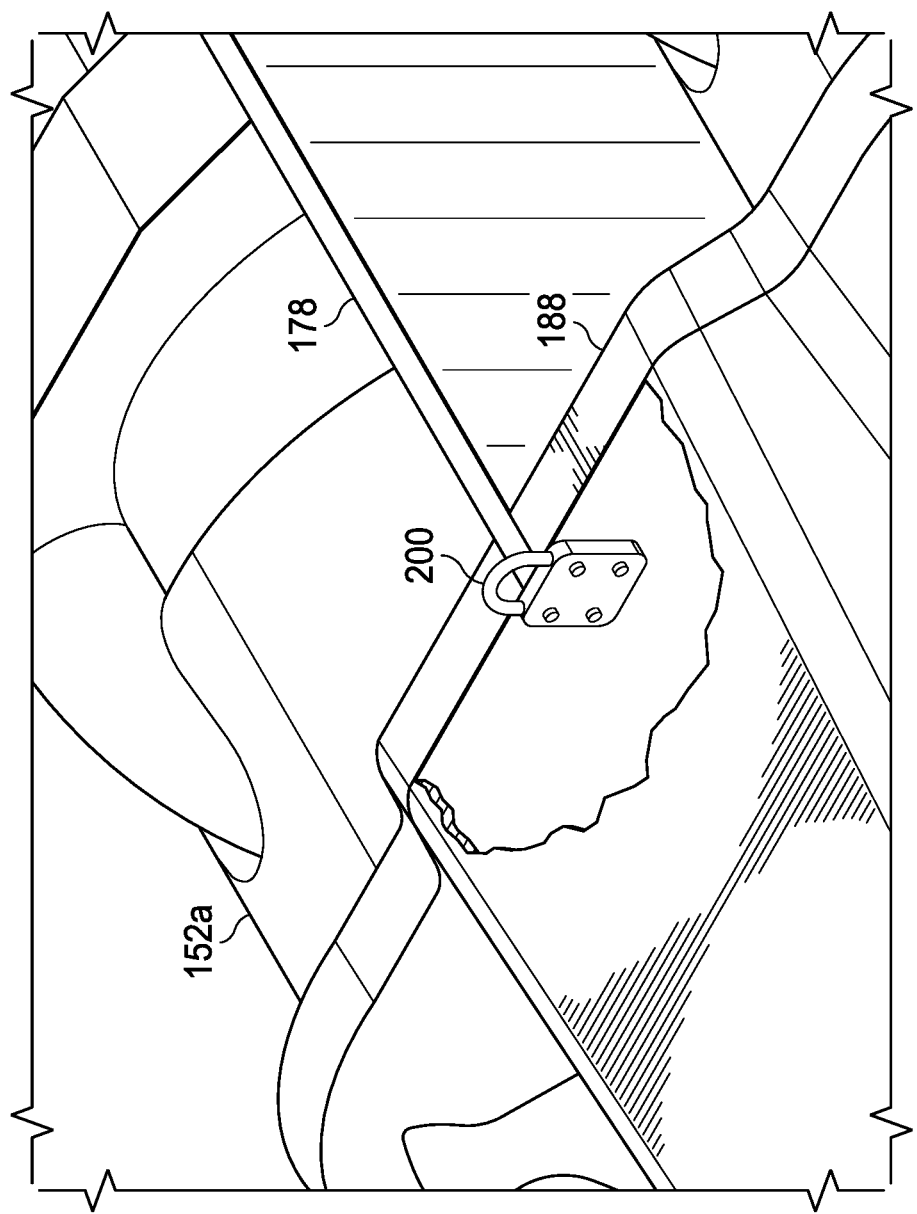

FIG. 9B shows yet another embodiment of a fall protection/restraint mechanism 200, which is shown positioned at the intersection of firewall 178 and firewall 188, which is the rear firewall shown in relation with engine 152a. The fall protection/restraint mechanism 200 depicted is permanently attached to the firewall 188 via bolts or rivets.

Figure 10A:
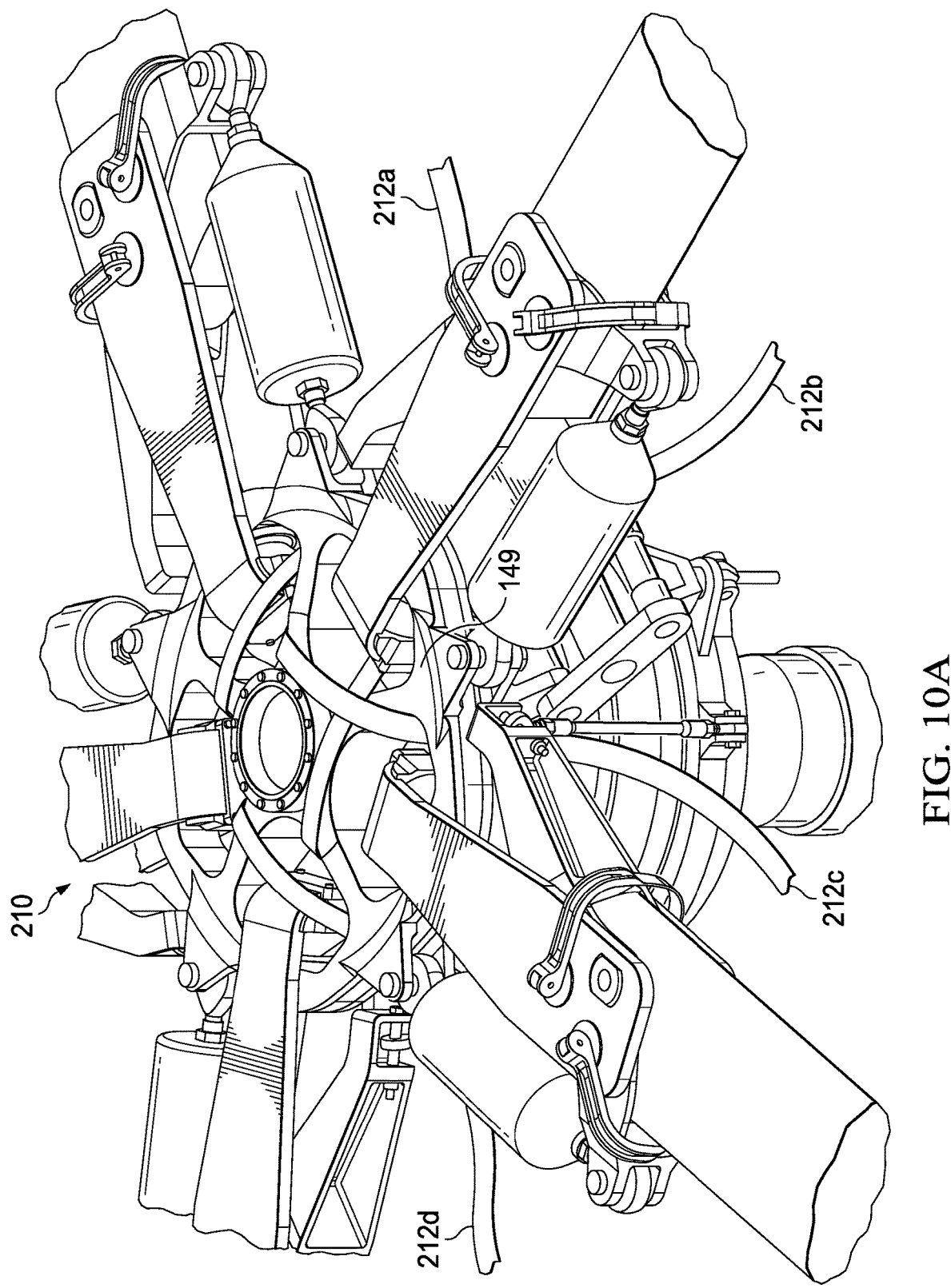
FIGS. 10A and 10B show a fall protection/restraint mechanism that includes multiple straps for temporary attachment to the yoke.
Figure 10B:
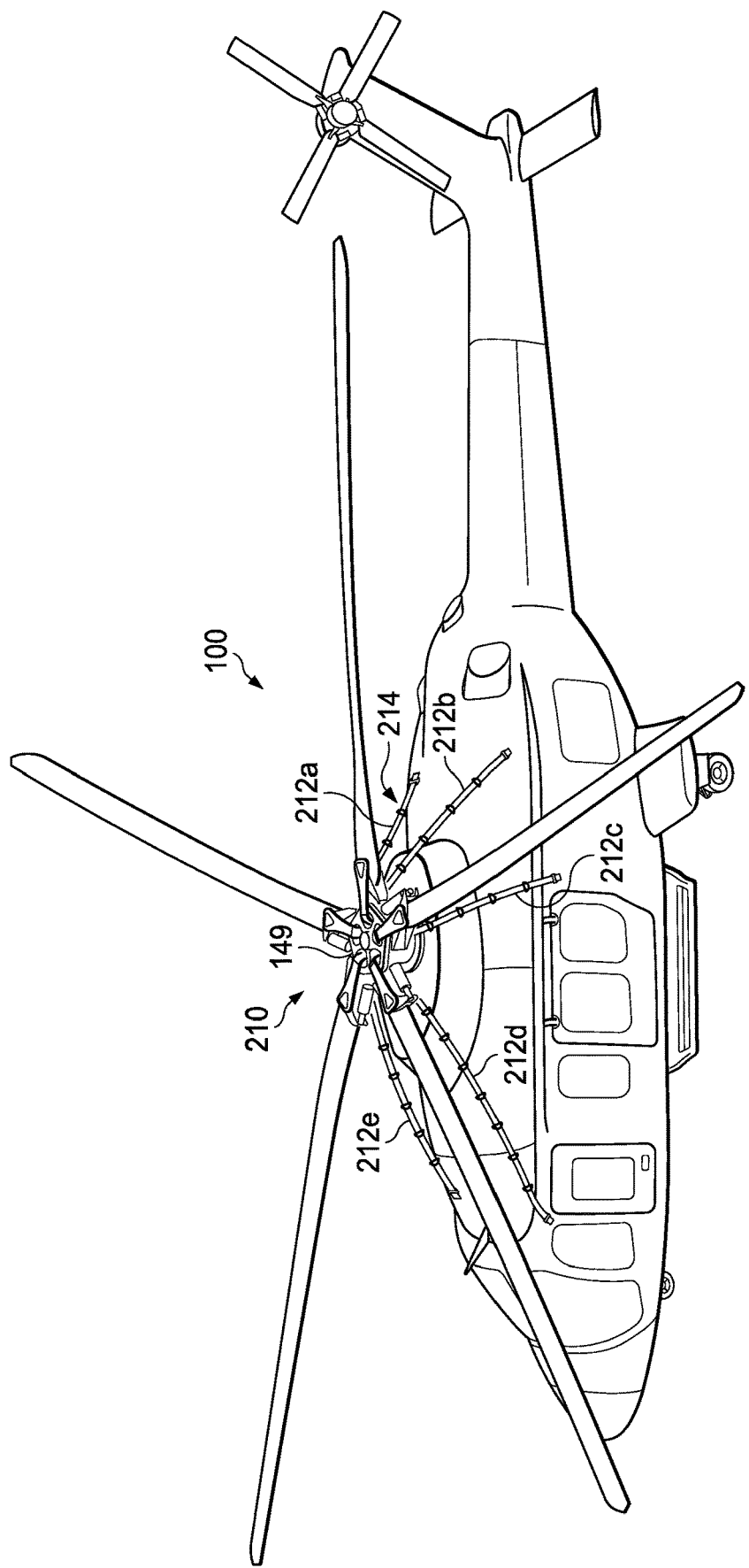

FIGS. 10A and 10B shows yet another embodiment of a fall protection/restraint mechanism 210, which includes straps 212a-e, which are temporarily attached to the yoke 149. This fall protection/restraint mechanism 210 provides fall protection/restraint when working on the yoke 149 and rotors, which often will be the highest accessible point of the rotorcraft. In FIG. 10B, the fall protection/restraint mechanism 210, which includes straps 212a-e, which are temporarily attached to the yoke 149 are shown with loops, rings, D-rings, or other attachment points 214 along the straps 212a-e. As shown, the fall protection/restraint mechanism 210 is depicted connected to the yoke 149 and are shown below the yoke 149. Not generally preferred but an option of the present invention is for the fall protection/restraint mechanism 210 to come out above the yoke 149 (not depicted).

Figure 11A:
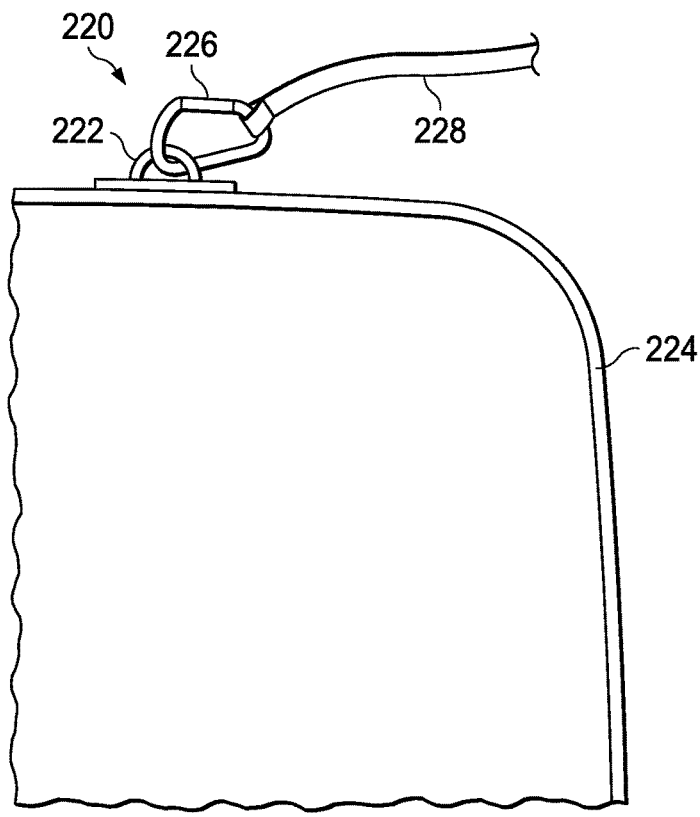
FIGS. 11A to 11C show multiple embodiments of fall protection/restraint attachment points that can be positioned in multiple locations around the central portion or body of the fuselage of the rotorcraft.
Figure 11B:
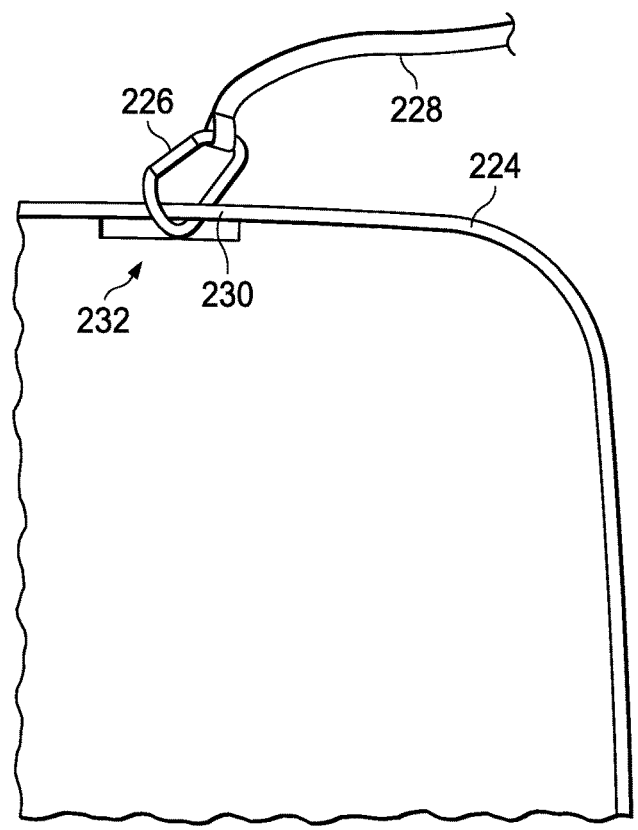
Figure 11C:
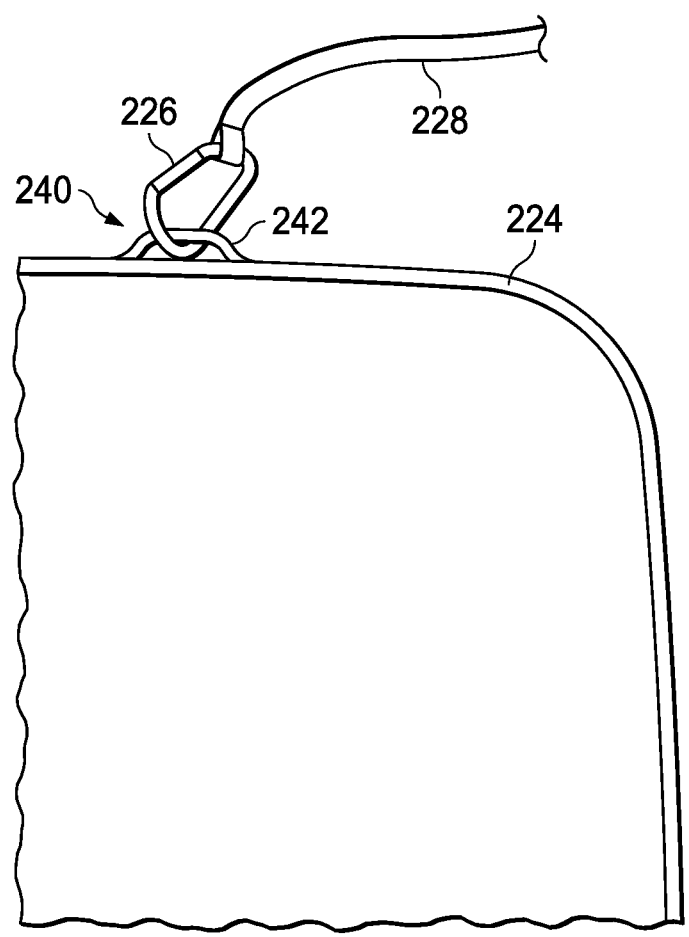

FIGS. 11A to 11C show multiple embodiments of fall protection/restraint attachment points 220 that can be positioned in multiple locations around the central portion or body of the fuselage 102 of the rotorcraft 100. In FIG. 11A, the fall protection/restraint attachment points 220 includes a loop 222, which is depicted as a permanent attachment, in his case on a firewall 224. A carabineer 226 attaches a strap 228 to the loop 222. In FIG. 11B, the fall protection/restraint attachment wire 230 is shown with an inset 232 along the firewall 224. The carabineer 226 attaches to the fall protection/restraint attachment wire 230 through the inset 232. FIG. 11C shows yet another embodiment of the fall protection/restraint attachment wire 240, which is depicted as integral with (e.g., welded) to the surface of the rotorcraft, in this version it is integral with a firewall 224 and provides at attachment point for a carabineer 226 that is attached to strap 228.

Figure 12A:
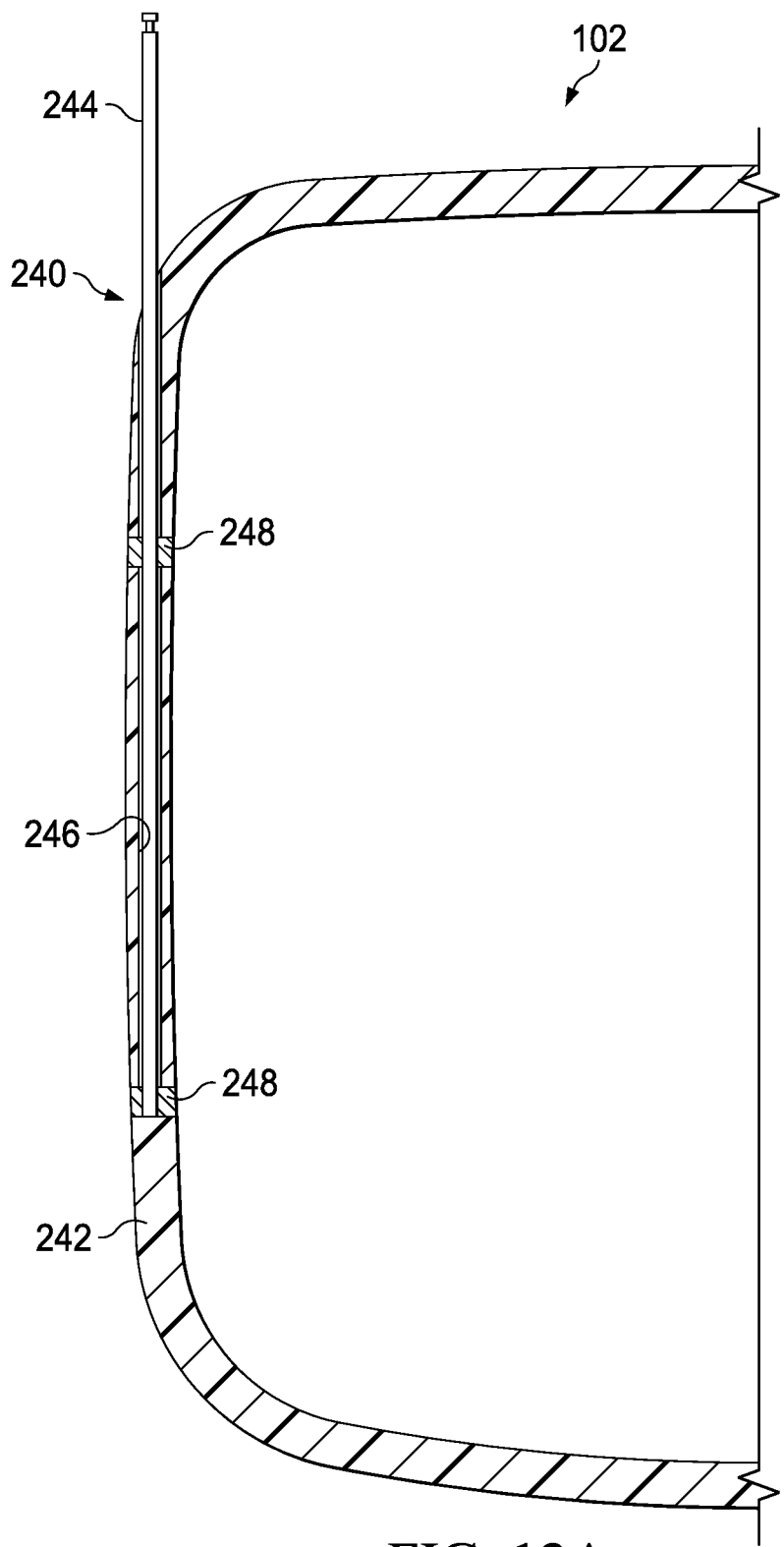
FIG. 12A shows a cross-sectional side view of a fall protection/restraint attachment shaft that is shown inserted into the fuselage.

FIG. 12A shows a cross-sectional side view of a fall protection/restraint attachment shaft 240 that is shown inserted into the fuselage 102, specifically the body 242 of the fuselage 102, wherein a shaft 244 is inserted into an opening 246 that is perpendicular to the ground, and within the body of the rotorcraft. The shaft 244 is inserted into the opening 246, which may include one or more hardpoints 248 that protect the body 242 of the fuselage 102. In one example, fall protection/restraint attachment shaft 240 system can include a single shaft 244, or can include two, three or four shafts 244 that can be positioned adjacent the doors of the rotorcraft 100, and the shafts can further be connected to each other via additional shafts or straps, thereby providing fall protection/restraint around the fuselage 102 at the doors of the rotorcraft.

Figure 12B:
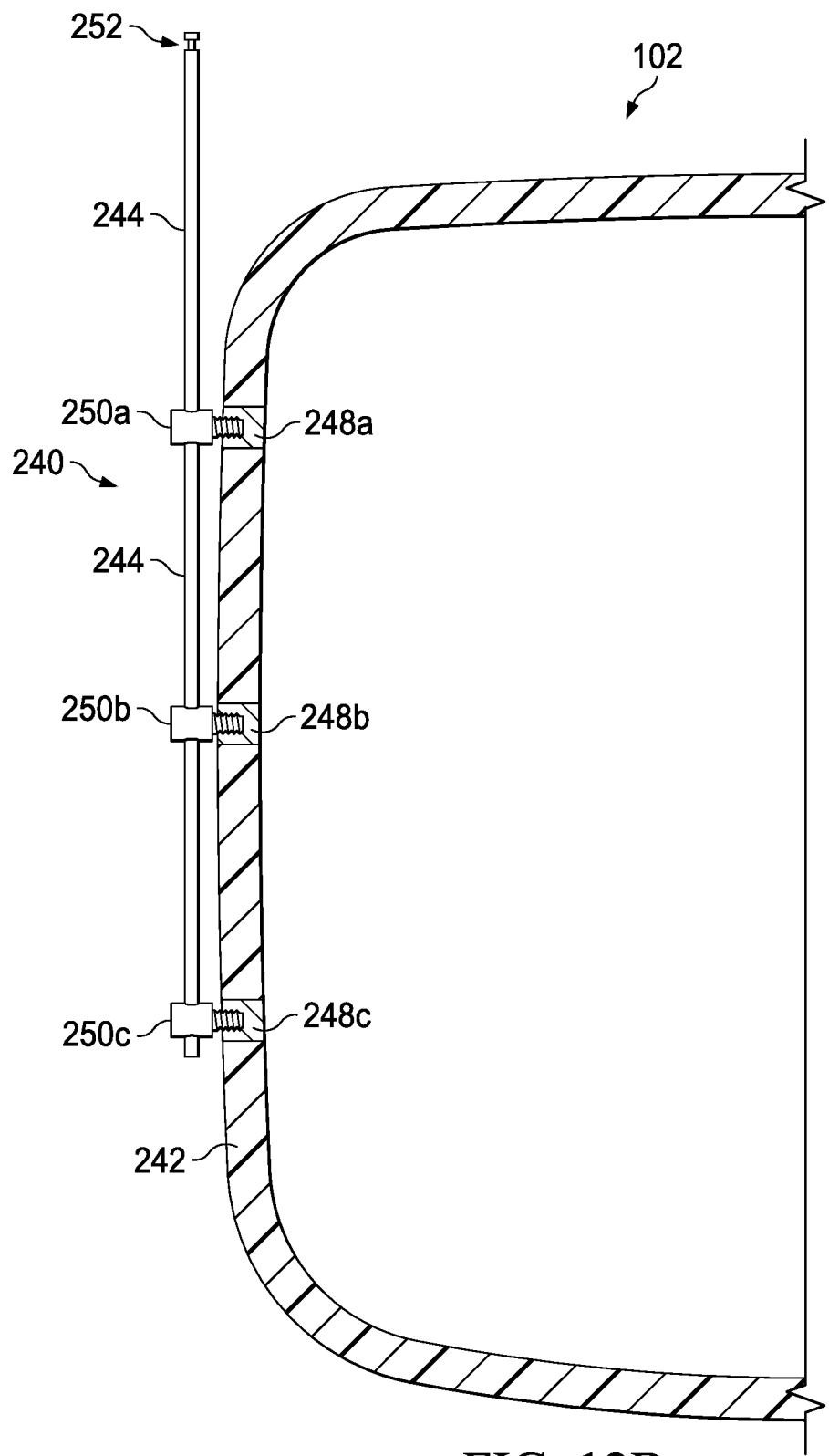
FIG. 12B shows a cross-sectional side view of another embodiment of the fall protection/restraint attachment shaft, but in this case outside the body of the rotorcraft and attached to removable attachment points.

FIG. 12B shows a cross-sectional side view of another embodiment of the fall protection/restraint attachment shaft 240, but in this case it is not within an opening in the body 242 of the rotorcraft 100, but rather, is attached to removable attachment points 250a-c, which are inserted or screwed into hard points 248a-c, respectively. The shaft 244 is held by the removable attachment points 250a-c and is also depicted having a strap or shaft attachment 252. The shaft and the removable attachment points 250a-c can be placed on the rotorcraft during maintenance, and can then be removed upon completion of the maintenance.

FIG. 12C shows an isometric view of a rotorcraft 100 showing one position for the attachment of the fall protection/restraint attachment shaft 240 that is removable. Additional fall protection/restraint attachment shafts 240 can be positioned along the fuselage on the opposite side of the door 252, and/or on the opposite side of the rotorcraft, e.g., forward and/or aft of the door (not depicted) on the far side of the rotorcraft 100.

Figure 12D:
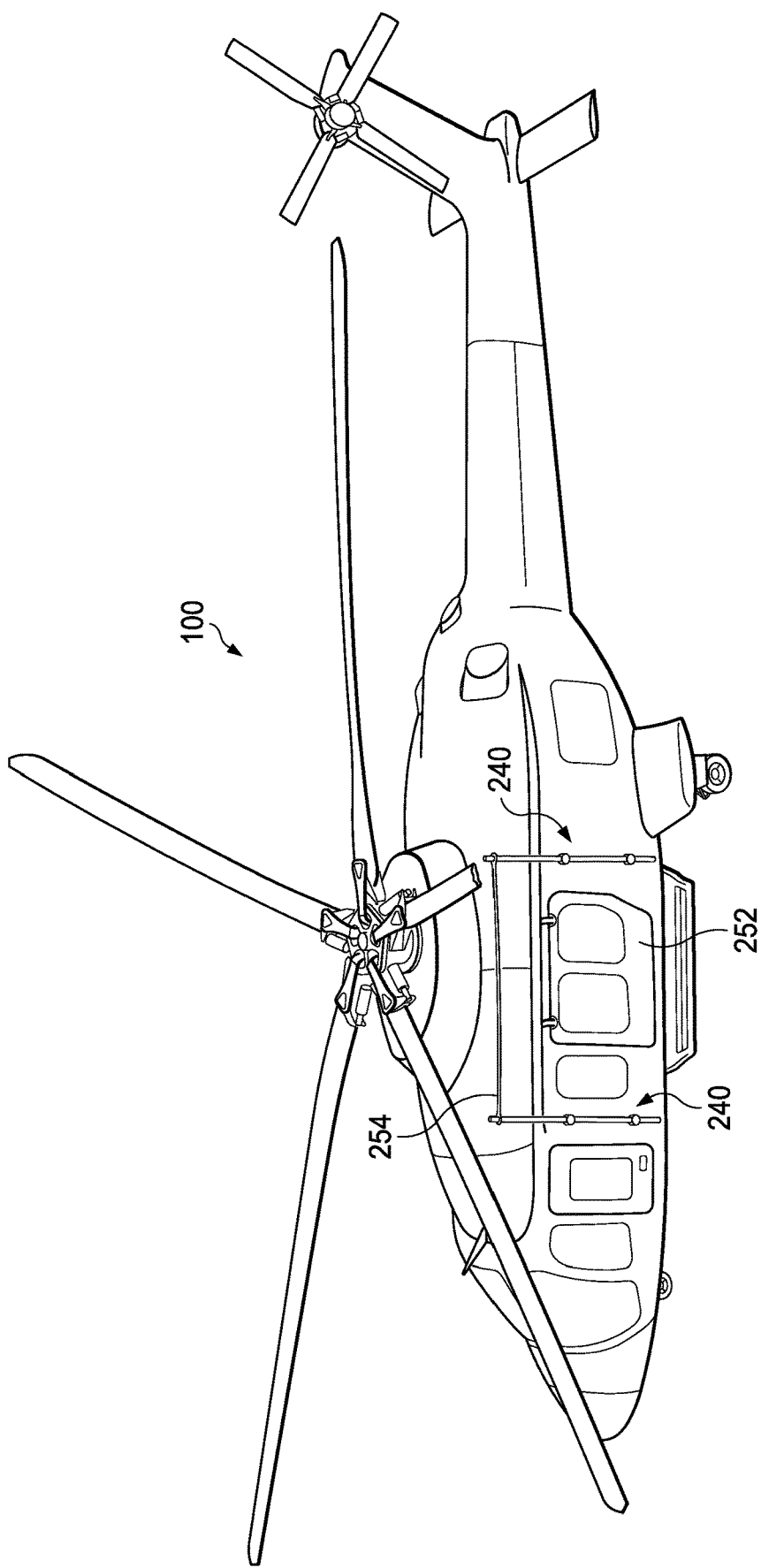
FIG. 12D shows an isometric view of a rotorcraft showing positions for the attachment of the fall protection/restraint attachment shafts that are removable on either side of the door.

FIG. 12D shows an isometric view of a rotorcraft 100 showing one position for the attachment of the fall protection/restraint attachment shafts 240 that are removable on either side of the door 252, connected via a tube or shaft 254 (but can also be a strap, elastic, etc.). The shafts 244 could also be in the same positions but with openings internal to the body of the fuselage (not depicted).

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic (s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A method of providing fall protection during maintenance of a rotorcraft comprising:
   providing at least one permanent, semi-permanent, or detachable safety bar, strap, fastener, hook, or loop that is integral to a rotorcraft, wherein the safety bar, strap, fastener, hook, or loop is attached in an area or surface at a top of the rotorcraft between a windshield of the rotorcraft and a tail boom of the rotorcraft, wherein the area or surface is at the rotor system, rotor blades, engine, engine cowling, engine firewall, or a shaft that extends from the top of the rotorcraft; and
   connecting a user safety device to the rotorcraft during maintenance on the rotorcraft, wherein the at least permanent, semi-permanent, or detachable safety bar, strap, fastener, hook, or loop that is attached to the rotorcraft to provide fall protection during maintenance of the rotorcraft on the ground.

2. The method of claim 1, further comprising positioning the strap on the side or top of the rotorcraft to provide an anchor point for the user safety device.

3. The method of claim 1, further comprising connecting one or more safety bars to one or more sides of the rotorcraft at hard points that are within or outside a body of the rotorcraft, wherein the safety bars have at least one of vertical, horizontal, or diagonal orientation to the ground and provides an anchor point for the user safety device.

4. The method of claim 1, further comprising positioning the safety bar, hook, or loop on a grip or a flapping stop of a main rotor of the rotorcraft.

5. The method of claim 1, further comprising positioning the safety bar, hook, or loop in, on, within, or about a firewall.

6. The method of claim 1, further comprising attaching the safety bar, strap, fastener, hook, or loop from a rotor.

7. The method of claim 1, further comprising attaching the safety bar, strap, fastener, hook, or loop to one or more hard points on an engine.

8. The method of claim 1, further comprising attaching the safety bar, strap, fastener, hook, or loop to a yoke of the rotorcraft.

9. The method of claim 1, wherein the user safety device is a line, belt, harness, fall limiter, sling seat, bosun chair, chest harness, fall prevention device, fall prevention system, fall restraint device, or personal fall arrest system.

10. The method of claim 1, further comprising attaching the permanent, semi-permanent, or detachable safety bar, strap, fastener, hook, or loop that is attached or attachable to a rotorcraft to a user via the safety device under austere environmental conditions.

11. The method of claim 1, further comprising performing maintenance on the rotorcraft.

12. The method of claim 11, further comprising disconnecting the user safety device from the rotorcraft after performing maintenance on the rotorcraft.

* * * * *